United States Patent [19]

Syrier et al.

[11] Patent Number: 4,992,499

[45] Date of Patent: Feb. 12, 1991

[54] STABILIZED ETHYLENE MONOXIDE COPOLYMERS

[75] Inventors: Johannes L. M. Syrier; Hendrik Van De Weg, both of Amsterdam, Netherlands; Robert Q. Kluttz, Houston, Tex.

[73] Assignee: Shell Oil Company, Houston, Tex.

[21] Appl. No.: 444,573

[22] Filed: Nov. 30, 1989

Related U.S. Application Data

[63] Continuation-in-part of Ser. No. 308,287, Feb. 9, 1989, abandoned.

[30] Foreign Application Priority Data

Feb. 29, 1988 [GB] United Kingdom ............... 8804726

[51] Int. Cl.$^5$ .............................................. C08K 5/18
[52] U.S. Cl. ...................... 524/194; 524/219; 524/222; 524/254; 524/255; 524/257; 524/291
[58] Field of Search ............... 524/255, 291, 257, 254, 524/194, 219, 222

[56] References Cited

U.S. PATENT DOCUMENTS

| | | | |
|---|---|---|---|
| 1,532,398 | 4/1925 | Geer et al. | 524/254 |
| 2,116,333 | 6/1938 | Williams et al. | 524/256 |
| 3,285,855 | 11/1965 | Dexter et al. | 524/291 |
| 3,357,946 | 12/1967 | Burgess | 524/342 |
| 3,533,992 | 10/1970 | Sundholm | 524/255 |
| 3,660,438 | 5/1972 | Dexter | 524/194 |
| 3,676,401 | 7/1972 | Henry | 523/126 |
| 3,694,412 | 9/1972 | Nozaki | 526/172 |
| 3,753,952 | 8/1973 | Guillet | 523/125 |
| 3,929,727 | 12/1975 | Russell et al. | 524/338 |
| 3,935,141 | 1/1976 | Potts et al. | 524/342 |
| 3,944,594 | 3/1976 | Kleiner et al. | 524/291 |
| 3,948,832 | 4/1976 | Hudgin | 528/392 |
| 4,024,104 | 5/1975 | Russell et al. | 524/91 |
| 4,145,556 | 3/1979 | Hirsch | 524/219 |
| 4,795,774 | 1/1989 | Klutz | 524/248 |

FOREIGN PATENT DOCUMENTS 121965 10/1984 European Pat. Off. .
257663 3/1988 European Pat. Off. .

OTHER PUBLICATIONS

Gerald Scott—*Atmospheric Oxidation and Antioxidants*—115,116,120–127,156–161 (1965).
Robert Leaversuch—Modern Plastics, 52–55 (Aug. 1987).
M. P. Groenewege et al.,—*Crystalline Olefin Polymers—Part 1*, 719,772,773-Kaft and Doak, ed. (1965).
Z. Osawa et al.—*Stabilization and Degradation of Polymers*—159–173, D. L. Allena et al., ed. (1978).
W. L. Hawkins et al.—*Crystalline Olefin Polymers Part II*, 361–398, Raff and Doak, ed. (1965).

Primary Examiner—Veronica P. Hoke

[57] ABSTRACT

Linear alternating polymers of carbon monoxide and at least one ethylenically unsaturated hydrocarbon are stabilized against thermal degradation by the inclusion therein of a stabilizing amount of a combination of a phenolic compound and an aromatic amine.

19 Claims, No Drawings

STABILIZED ETHYLENE MONOXIDE COPOLYMERS

RELATED APPLICATIONS

This application is a continuation-in-part of U.S. patent application Ser. No. 308,287, filed Feb. 9, 1989 now abandoned.

FIELD OF THE INVENTION

This invention relates to compositions comprising a linear alternating polymer of carbon monoxide and at least one ethylenically unsaturated hydrocarbon. More particularly, the invention relates to compositions of such polymers which are stabilized against thermal degradation by the inclusion therein of combinations of certain phenolic compounds and aromatic amines.

BACKGROUND OF THE INVENTION

The class of polymers of carbon monoxide and olefin(s) has been known for some time. Brubaker, U.S. Pat. No. 2,495,286, produced such polymers of relatively low carbon monoxide content in the presence of free radical initiators, e.g., peroxy compounds. U.K. Pat. No. 1,081,304 discloses related polymers of higher carbon monoxide content produced in the presence of trialkylphosphine complexes of palladium salts as catalyst. Nozaki extended the reaction to produce linear alternating polymers in the presence of triarylphosphine complexes of palladium moieties and certain inert solvents. See, for example, U.S. Pat. No. 3,694,412.

More recently, the class of linear alternating polymers of carbon monoxide and at least one ethylenically unsaturated hydrocarbon has become of greater interest in part because of the greater availability of the polymers. The more recent processes for the production of the linear alternating polymers, now becoming known as polyketone polymers or polyketones, are illustrated by number of published European Patent Applications including 121,965, 181,014, 213,671 and 257,663. The process generally involves the use of a catalyst composition formed from a compound of a Group VIII metal selected from palladium, cobalt or nickel, the anion of a non-hydrohalogenic acid having a pKa below 2 and a bidentate ligand of phosphorus, arsenic or antimony.

The resulting polymers are relatively high molecular weight thermoplastic materials having utility in the production of shaped articles such as containers for food and drink and as parts and housings for the automotive industry, which articles are produced by methods conventional for thermoplastics such as extrusion, injection molding or thermoforming. These polymers are now considered to be conventional.

Although the polyketone polymers are relatively stable and have good properties, the linear alternating polymers do undergo to some extent the thermal degradation that is characteristic of most if not all organic polymers. There are a large number of thermal stabilizers which are employed commercially to stabilize thermoplastic polymers against such degradation. However, many of the thermal stabilizers which are known to be effective with polyolefins, polyamides or polyacrylates are not effective when employed with linear alternating polymers of carbon monoxide and at least one ethylenically unsaturated hydrocarbon. Russell et al, U.S. Pat. No. 3,929,729 and U.S. Pat. No. 4,024,104, teach the use of certain benzophenones and certain benzotriazines, respectively, as thermal stabilizers for a broad range of polymers of carbon monoxide and ethylene with the optional presence of third monomers. The scope of the polymers disclosed by Russell et al is relatively broad but the polymers tested ar relatively limited and the Russell et al disclosure does not appear to be specifically directed toward linear alternating polymers. It would be of advantage to provide for the efficient stabilization of such linear alternating polymers of carbon monoxide and at least one ethylenically unsaturated hydrocarbon against thermal degradation.

SUMMARY OF THE INVENTION

The present invention relates to certain polymeric compositions stabilized against thermal degradation. More particularly, the invention relates to compositions comprising linear alternating polymer of carbon monoxide and at least one ethylenically unsaturated hydrocarbon, which compositions are stabilized against thermal degradation by the presence of a stabilizing amount of a combination of certain phenolic compounds and certain aromatic amines.

DESCRIPTION OF THE INVENTION

It has now been found that effective thermal stabilization of linear alternating polymers of carbon monoxide and at least one ethylenically unsaturated hydrocarbon is provided by combinations of certain hindered phenolic compounds and certain aromatic amines, which combinations are more effective than the individual components if employed alone. The present invention therefore provides for the thermal stabilization of such linear alternating polymers by the inclusion therein of a stabilizing amount of a combination of certain phenolic compounds and certain aromatic amines.

The polymers which are stabilized according to the invention are linear alternating polymers of carbon monoxide and at least one ethylenically unsaturated hydrocarbon. The ethylenically unsaturated hydrocarbons which are useful as precursors of the linear alternating polymers have up to 20 carbon atoms inclusive, preferably up to 10 carbon atoms inclusive, and are aliphatic such as ethylene and other $\alpha$-olefins including propylene, 1-butene, isobutylene, 1-hexene, 1-octene and 1-dodecene or are arylaliphatic having an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. Preferred polyketone polymers are copolymers of carbon monoxide and ethylene or terpolymers of carbon monoxide, ethylene and a second ethylenically unsaturated hydrocarbon of at least 3 carbon atoms, particularly an $\alpha$-olefin such as propylene.

When the preferred terpolymers of the invention are employed in the compositions of the invention there will be at least about two units incorporating a moiety of ethylene for each unit incorporating a moiety of the second hydrocarbon. Preferably, there will be from about 10 units to about 100 units incorporating a moiety of ethylene for each unit incorporating a moiety of the second hydrocarbon. The polymer chain of the preferred polymers is therefore represented by the repeating formula

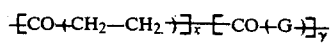

wherein G is a moiety of the second hydrocarbon of at least 3 carbon atoms polymerized through the ethylenic unsaturation thereof and the ratio of y:x is no more than about 0.5. When the preferred copolymers of carbon monoxide and ethylene are employed in the compositions of the invention there will be no second hydrocarbon present and y is zero. When y is other than zero, i.e., terpolymers are employed, the —CO—CH$_2$CH$_2$—units and and the —CO—G—units occur randomly throughout the terpolymer and the preferred ratios of y:x are from about 0.01 to about 0.1. The end groups or "caps" of the polymers will depend upon the particular materials present during the production of the polymer and how or whether the polymer was purified. The precise nature of the end groups is of little apparent significance so far as the overall properties of the polymer are concerned so that the polymers are fairly represented by the polymer chain as depicted above.

Of particular interest are the polymers of the above formula I having a molecular weight from about 2000 to about 200,000, particularly those of molecular weight from about 6,000 to about 50,000. The physical properties of such polymers will depend in part upon the molecular weight of the polymer, whether the polymer is a copolymer or a terpolymer and, in the case of terpolymers, the nature of and the proportion of the second hydrocarbon present. Typical melting points of such polymers are from about 175° C. to about 280° C., particularly from about 210° C. to about 270° C. The polymers will have a limiting viscosity number (LVN), measured in a standard capillary viscosity measuring device in m-cresol at 60° C., of from about 0.4 dl/g to about 10 dl/g, preferably from about 0.8 dl/g to about 4 dl/g.

The polymers are produced by the general methods illustrated by the above published European Patent Applications. Although the scope of the polymerization process is extensive, a preferred catalyst composition for such polymerization is formed from palladium acetate, the anion of trifluoroacetic acid or p-toluenesulfonic acid and a bidentate ligand selected from 1,3-(diphenylphosphino)propane or 1,3-bis[di(2-methoxyphenyl)phosphino]propane.

The polyketone polymers of the invention are stabilized against thermal degradation by the inclusion therein of a stabilizing quantity of a combination of certain phenolic compounds and certain aromatic amines. The phenolic compound employed in the stabilizing combinations of the invention is selected from (a) alkyl esters of monovalent carboxylic acids of 2 to 8 carbon atoms inclusive having a terminal hydroxyaryl substituent, the alkyl moiety of the ester having from 12 to 24 carbon atoms inclusive, (b) symmetrical diesters of hydroxyphenyl-substituted aliphatic monocarboxylic acids and N,N'-di(hydroxyalkyl)oxalamide, (c) symmetrical diesters of hydroxyphenyl-substituted aliphatic monocarboxylic acids and polyoxyalkylene glycols of from 2 to 4 oxyalkylene units, inclusive, or (d) symmetrical hydroxyphenyl-substituted N,N'-dialkanoylhydrazides.

The hydroxyphenyl group(s) of the phenolic compounds of the above classes (a) through (d) are hindered phenolic substituents and are preferably 4-hydroxy-3,5-dialkyl substituents wherein at least one and preferably both of the alkyl substituents in the 3 and 5 positions are branched alkyl of from 3 to 5 carbon atoms, e.g., i-propyl, sec-butyl, t-butyl and t-amyl. Preferred as the alkyl substituent in the 3 and 5 positions is t-butyl and the preferred hydroxyphenyl substituents are 4-hydroxy-3,5-di-t-butylphenyl substituents.

Within the phenolic compounds of class (a) the acid moiety is preferably of from 2 to 6 carbon atoms inclusive with propionic acids being preferred. Illustrative of such phenolic compounds are dodecyl 3-(4-hydroxy-3,5-di-t-butylphenyl)propionate and octadecyl 3-(4-hydroxy-3-t-butyl-5-t-amylphenyl)propionate.

The esters of N,N'-di(hydroxyalkyl)oxalamide incorporate hydroxyalkyl groups of from 2 to 6 carbon atoms inclusive but the preferred hydroxyalkyl group is a hydroxyethyl group. The diester of 3-(4-hydroxy-3,5-di-t-butylphenyl)propionic acid and N,N'-di(2-hydroxyethyl)oxalamide is illustrative of this class of phenolic compounds.

The polyoxyalkylene glycol precursors of the phenolic compounds of class (c) incorporate alkylene moieties of from 2 to 6 carbon atoms inclusive. The preferred polyoxyalkylene glycols are polyoxyethylene glycols, especially trioxyethylene glycol. The symmetrical diester of 3-(3-t-butyl-4-hydroxy,-5-methylphenyl)propionic acid and trioxyethylene glycol is illustrative of this class of phenolic compounds.

The N,N'-dialkanoylhydrazides of class (d) contain alkanoyl moieties of from 2 to 8 carbon atoms inclusive although propanoyl moieties are preferred. The symmetrical N,N'-bis[3-(4-hydroxy-3,5-di-t-butylphenyl)propanoyl]hydrazide is representative of this class.

In the compositions of the invention the linear alternating polymers are stabilized by the presence of certain combinations of the phenolic compound as defined above and certain aromatic amines. The aromatic amines are preferably (1) diphenylamines, particularly dibenzyl diphenylamines or anilino-diphenylamines wherein any remaining valences of nitrogen moieties are substituted with hydrogen or alkyl of up to 6 carbon atoms inclusive, or (2) diaminonaphthalenes wherein the nitrogens are substituted with hydrogen or alkyl of up to 6 carbon atoms inclusive.

Illustrative of the anilinodiphenylamines useful in the compositions of the invention are 4-anilinodiphenylamine, 3-anilinodiphenylamine and 4-anilino-N-methyldiphenylamine. The dibenzyl diphenylamines are illustrated by 4,4'-dibenzyldiphenylamine, 4-(α-methylbenzyl)-4'-(α-i-butylbenzyl)diphenylamine and 4,4'-bis(α,α-dimethylbenzyl)diphenylamine. The diaminonaphthalenes employed as the aromatic amine component are preferably 1,8-diaminonaphthalenes such as 1,8-diaminonaphthalene, N,N'-diethyl-1.8-diaminonaphthalene and N,N,N',N'-tetramethyl-1,8-diaminonaphthalene.

The combination of phenolic compound and aromatic amine is employed in a stabilizing quantity. Such amounts are from about 0.05% by weight to about 1.5% by weight of each component, based on total composition, but preferably in an amount of each component of from about 0.1% by weight to about 1% by weight on the same basis.

It is, on occasion, useful although not required to employ a co-stabilizer which preferably is a sterically hindered pyridine, particularly a 2,6-dialkylpyridine such as 2,6-di-t-butylpyridine. The co-stabilizer is not required but when employed it is provided in an amount up to about 1% by weight based on total solution.

The phenolic compound, the aromatic amine and, if employed, the co-stabilizer are added to the polyketone polymer by conventional methods suitable for producing an intimate mixture of the polymer and the additives without unduly degrading the polymer or the other composition components. Such methods include the dry-blending of the components in a finely divided form followed by hot-pressing, passing the mixture of the composition components through an extruder to produce the composition as an extrudate or by intimate mixing in a mixer or a blender operating at high shear. The stabilized compositions may contain other additives such as colorants, dyes, plasticizers, processing aids, or reinforcements which are added to the polymer together with or separately from the phenolic compound, the organic amine and, if used, the co-stabilizer.

The stabilized polyketone polymer compositions are useful in the production of fibers, films, sheets, wires and cables and shaped articles by procedures conventional for the processing of thermoplastic polymers, e.g., melt-spinning, extrusion, injection molding or thermoforming. The compositions are especially useful in applications where the final product is to be subjected to elevated temperatures because of the enhanced thermal stability of the compositions as compared to the non-stabilized polymer.

The invention is further illustrated by the following Comparative Example (not of the invention) and the Illustrative Embodiments which should not be construed as limiting the invention.

COMPARATIVE EXAMPLE

The use of certain hindered phenolic compounds as thermal stabilizers in a linear alternating polymer was evaluated using a terpolymer of carbon monoxide, ethylene and propylene having a melting point of 218° C. and an intrinsic viscosity number of 1.82 dl/g as determined in m-cresol at 60° C. The phenolic compounds evaluated were the following compounds.

A. n-Octadecyl ester of 3-(4-hydroxy-3,5-di-t-butylphenyl)propionic acid.
B. Symmetrical diester of 3-(4-hydroxy-3,5-di-t-butylphenyl)propionic acid and N,N'-di(2-hydroxyethyl)oxalamide.
C. Symmetrical diester of 3-(3-t-butyl-4-hydroxy-5-methylphenyl)-propionic acid and trioxyethyleneglycol.
D. N,N'-bis[3-(4-hydroxy-3,5-di-t-butylphenyl)-propanoyl]hydrazide.

In each case, a test specimen was prepared of the terpolymer and 0.3% by weight, based on total composition, of one of the above phenolic compounds. The specimens were produced by a compression molding process and each specimen was 30 mm long, 1 mm thick, and 3 mm wide. The specimens were subjected to an aerobic oven aging test at two oven temperatures by periodically removing the specimen from the oven and bending it by hand at an angle of 180 degrees. The appearance of cracks in the specimen was recorded as brittleness (failure) and the time in the oven to reach the point of failure was recorded. The results of these tests are shown in Table 1.

TABLE I

| Phenolic Compound | Time to Failure (Hours) at | |
|---|---|---|
| | 135° C. | 115° C. |
| A | 17 | 90 |
| B | 73 | 284 |
| C | 65 | 280 |

TABLE I-continued

| Phenolic Compound | Time to Failure (Hours) at | |
|---|---|---|
| | 135° C. | 115° C. |
| D | 65 | 280 |

ILLUSTRATIVE EMBODIMENT I

By the procedure of the Comparative Example, test specimens were prepared using the terpolymer and the phenolic compounds of the Comparative Example but also containing 0.3% by weight based on total composition of certain aromatic amines. The amines evaluated in combination with the phenolic compounds were the following aromatic amines.

X. 4-anilinodiphenylamine
Y. N,N,N',N'-tetramethyl-1,8-diaminonaphthalene
Z. 4,4'-Bis($\alpha,\alpha$-dimethylbenzyl)diphenylamine The test specimens were evaluated by the procedure of the Comparative Example and the results are shown in Table II.

TABLE II

| Phenolic Compound | Aromatic Compound | Time to Failure (Hours) at | |
|---|---|---|---|
| | | 135° C. | 115° C. |
| A | Z | 70 | 290 |
| A | Y | 40 | 145 |
| A | X | 30 | 170 |
| B | Z | 80 | 360 |
| C | Z | 80 | 340 |
| D | Z | 70 | 400 |

ILLUSTRATIVE EMBODIMENT II

To further illustrate the synergistic effects of the combinations of the invention, compositions were produced by the procedure of the Comparative Example, but employing a terpolymer of carbon monoxide, ethylene and propylene having a melting point of 223° C. and a limiting viscosity number (LVN), measured in m-cresol at 60° C., of 1.82 dl/g. The specimens were evaluated by a procedure substantially similar to that of the Comparative Example. The results are shown in Table III.

TABLE III

| Phenolic Compound, % Wt. | Amine Compound, % Wt. | Time to Failure (Days) at | |
|---|---|---|---|
| | | 125° C. | 100° C. |
| B, 0.5 | None | 9 | 49 |
| None | Z, 0.5 | 12 | 65 |
| B, 0.25 | Z, 0.25 | 16.3 | 96 |
| B, 0.5 | Z, 0.5 | 16.2 | 103 |

What is claimed is:

1. A composition stabilized against thermal degradation comprising a linear alternating polymer of carbon monoxide and at least one ethylenically unsaturated hydrocarbon and intimately mixed therewith a stabilizing quantity of a combination of (A) a phenolic compound selected from
   (i) an alkyl ester of a monovalent carboxylic acid of from 2 to 8 carbon atoms having a terminal hydroxyphenyl substituent, the alkyl moiety of the ester having from 12 to 24 carbon atoms inclusive,
   (ii) symmetrical diesters of a hydroxyphenyl-substituted aliphatic monocarboxylic acid and N,N'-di(hydroxyalkyl)oxalamide, (iii) symmetrical diesters of a hydroxyphenyl-substituted aliphatic monocarboxylic acid and polyoxyalkylene glycols of from 2 to 4 oxyalkylene units, inclusive, or (iv) symmetrical hydroxyphenyl-substituted N,N'-dialkanoylhydrazides, wherein the hydroxyphenyl substituents are hindered phenolic substituents, and (B) an aromatic amine selected from (a) diphenylamines, or (b) 1,8-diaminonaphthalenes.

2. The composition of claim 1 wherein the polymer is represented by the formula

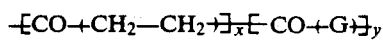

wherein G is an ethylenically unsaturated hydrocarbon of at least 3 carbon atoms polymerized through the ethylenic unsaturation thereof and the ratio of y:x is no more than about 0.5.

3. The composition of claim 2 wherein y is zero.

4. The composition of claim 2 wherein G is a moiety of propylene and the ratio of y:x is from about 0.01 to about 0.1.

5. The composition of claim 4 wherein the phenolic compound is an alkyl ester of a propionic acid having a terminal 4-hydroxy-3,5-dialkylphenyl substituent with at least one of the alkyl substituents being branched.

6. The composition of claim 5 wherein the branched alkyl moieties are t-butyl.

7. The composition of claim 6 wherein the aromatic amine is 4,4'-bis($\alpha,\alpha$-dimethylbenzyl)diphenylamine.

8. The composition of claim 6 wherein the amine is N,N,N',N'-tetramethyl-1,8-diaminonaphthalene.

9. The composition of claim 4 wherein the phenolic compound is a symmetrical diester of a 3-[4-hydroxy-3,5-di(branched alkyl)phenyl]-propionic acid and a N,N'-di(hydroxyalkyl)oxalamide.

10. The composition of claim 9 wherein the hydroxyalkyl moieties are 2-hydroxyethyl.

11. The composition of claim 10 wherein the branched alkyl moieties are t-butyl.

12. The composition of claim 11 wherein the aromatic amine is 4,4'-bis($\alpha,\alpha$-dimethylbenzyl)diphenylamine.

13. The composition of claim 4 wherein the phenolic compound is a symmetrical diester of a 3-[3-(branched alkyl)-4-hydroxy-5-methylphenyl]-propionic acid and polyoxyalkylene glycol of from 2 to 4 oxyalkylene units, inclusive.

14. The composition of claim 13 wherein the polyoxyalkylene glycol is polyoxyethylene glycol.

15. The composition of claim 14 wherein the branched alkyl moiety is t-butyl.

16. The composition of claim 15 wherein the polyoxyethylene glycol is trioxyethylene glycol.

17. The composition of claim 16 wherein the aromatic amine is 4,4'-bis($\alpha,\alpha$-dimethylbenzyl)diphenylamine.

18. The composition of claim 4 wherein the phenolic compound is a symmetrical N,N'-bis[4-hydroxy-3,5-di(branched alkyl)phenylpropanoyl]-hydrazide.

19. The composition of claim 18 wherein the branched moieties are t-butyl.

* * * * *